United States Patent Office 3,506,341
Patented Apr. 14, 1970

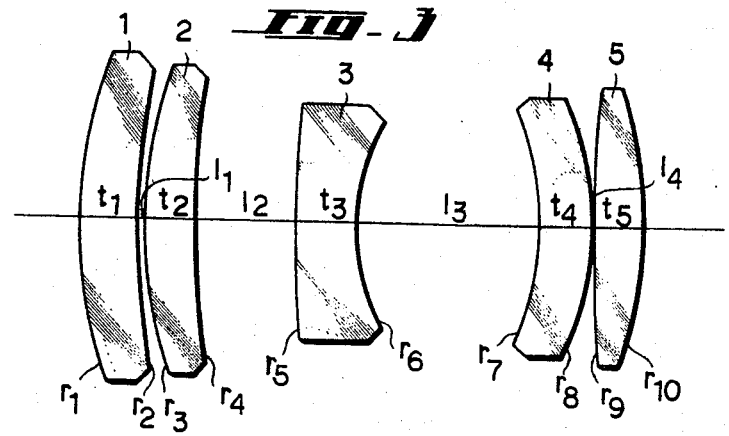
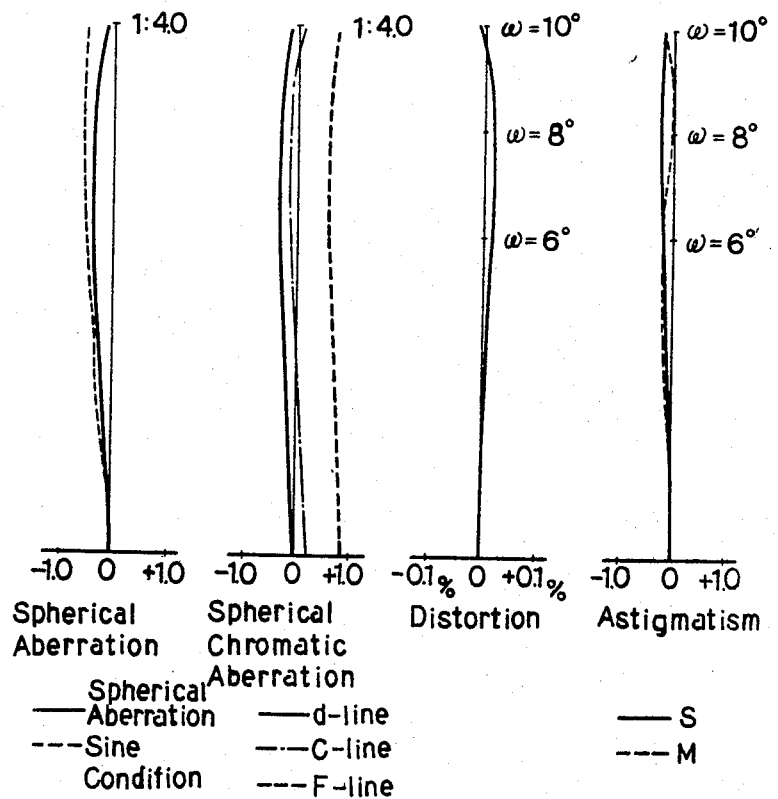

3,506,341
LONG FOCAL LENGTH LENS SYSTEM
Tomokazu Kazamaki and Yasuo Takahashi, Tokyo-to, Japan, assignors to Asahi Kogaku Kogyo Kabushiki Kaisha, Tokyo-to, Japan, a corporation of Japan
Filed Apr. 11, 1967, Ser. No. 629,976
Claims priority, application Japan, Apr. 15, 1966, 41/23,573
Int. Cl. G02b 9/60
U.S. Cl. 350—218                    2 Claims

ABSTRACT OF THE DISCLOSURE

A highly corrected long focal length objective lens system includes five spaced single element lenses. The first and second lenses are positive meniscus types, the third and fourth lenses are negative meniscus types and the fifth lens is positive with its rear face of greater curvature than its front face. The lens system satisfies the following conditions:

$$\nu_1, \nu_2 \geq 56$$
$$25 < \nu_3 < 29$$
$$F/2.2 < F_{1.2} < F/1.8$$
$$0.08F < l_2 < 0.12F$$
$$0.2F \leq r_6 \leq 0.3F$$
$$0.18F \leq |r_7| \leq 0.32F$$
$$2F \leq r_9$$
$$1.68 < n_3$$
$$1.52 < n_4 < 1.6$$
$$1.7 < n_5 < 1.8$$

wherein the lenses are successively designated as 1 to 5 and the lens faces are successively designated 1 to 10 and $\nu_i$ is the Abbe number of the $i$-th lens, $n_i$ is the $d$-line refractive index of the $i$-th lens, F is the resultant focal length of the lens system, $F_{1.2}$ is the resultant focal length of the first two lenses, $r_j$ is the radius of curvature of the $j$-th face, and $l_k$ is the spacing between the $k$-th lens and the next successive lens.

BACKGROUND OF THE INVENTION

The present invention relates generally to improvements in lens systems and it relates particularly to an improved highly corrected objective lens system of long focal length.

In many of the conventional lens systems the number of lenses employed is relatively small in order to obtain a brightness approaching its practical limit. However, such lens systems are accompanied by many drawbacks and disadvantages resulting in a low performance lens system leaving much to be desired.

SUMMARY OF THE INVENTION

A principal object of the present invention is to provide an improved lens system.

Another object of the present invention is to provide a high performance lens system of long focal length.

Still another object of the present invention is to provide a highly corrected objective lens system of long focal length and great simplicity and of relatively small brightness.

The above and other objects of the present invention will become apparent from a reading of the following description taken in conjunction with the accompanying drawings.

In a sense the present invention contemplates the provision of a lens system comprising five lens and satisfying the following conditions:

$$\nu_1, \nu_2 \geq 56$$
$$25 < \nu_3 < 29$$
$$F/2.2 < F_{1.2} < F/1.8$$
$$0.08F < l_2 < 0.12F$$
$$0.2F \leq r_6 \leq 0.3F$$
$$0.18F \leq |r_7| \leq 0.32F$$
$$2F \leq r_9$$
$$1.68 < n_3$$
$$1.52 < n_4 < 1.6$$
$$1.7 < n_5 < 1.8$$

wherein the lenses are successively designated as 1 to 5 and the lens faces are successively designated as 1 to 10 and $\nu_i$ is the Abbe number of the $i$-th lens, $n_i$ is the $d$-line refractive index of the $i$-th lens, F is the resultant focal length of the lens system, $F_{1.2}$ is the resultant focal length of the first two lenses, $r_j$ is the radius of curvature of the $j$-th face, and $l_k$ is the spacing between the $k$-th lens and the next successive lens. The lenses are spaced from each other and advantageously the first and second lenses are of positive meniscus type, the third and fourth lenses are of negative meniscus type and the fifth lens is positive with its rear face of greater curvature than its front face.

The lens system according to the present invention is a high performance, highly corrected lens of great simplicity whereby to avoid the drawbacks of the conventional long focal length lens systems.

BRIEF DESCRIPTION OF THE DRAWINGS

FIGURE 3 is a longitudinal view of another lens system embodying the present invention; and FIGURE 4 is a set of aberration curves of the lens system of FIGURE 3.

DESCRIPTION OF THE PREFERRED EMBODIMENTS

Figure 1:
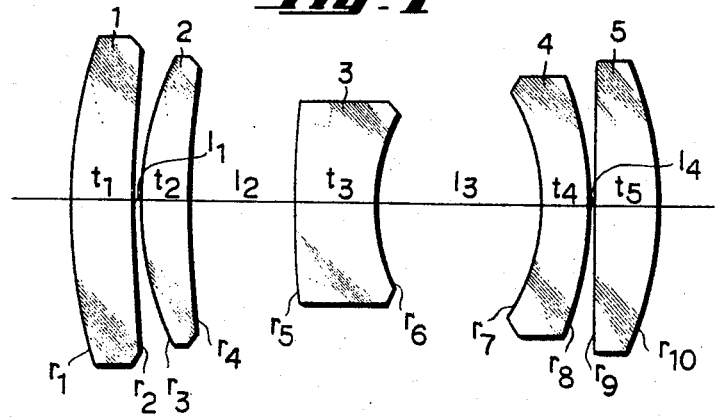
FIGURE 1 is a longitudinal sectional view of a lens system embodying the present invention.
Figure 2:
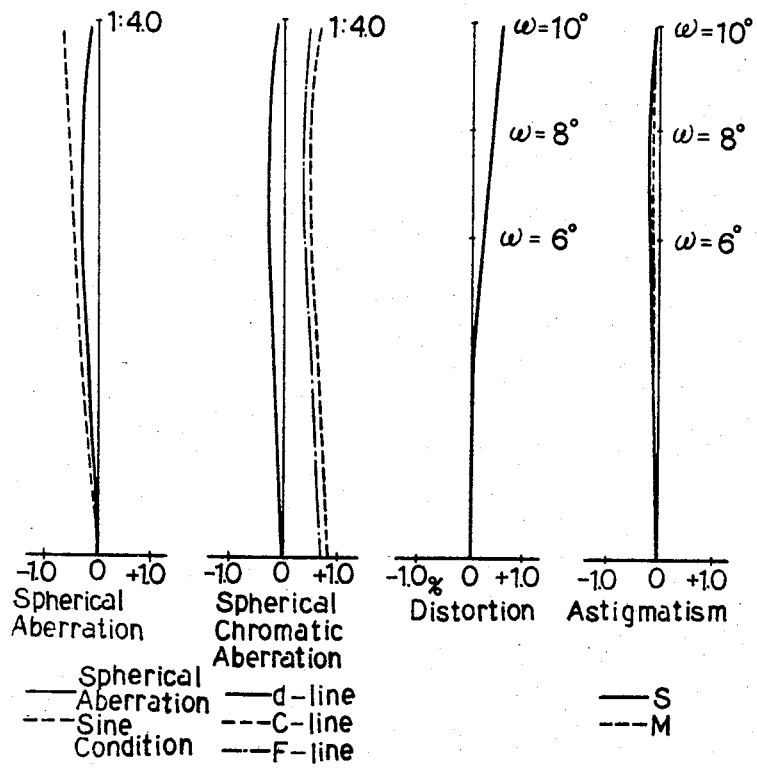
FIGURE 2 is a set of aberration curves of the lens system of FIGURE 1.

Referring now to the drawings, and particularly FIGURES 1 and 2 thereof which illustrate a preferred embodiment of the present invention and the aberration curves thereof, the improved lens system comprises five lenses including:

A first positive meniscus lens 1 having a thickness $t_1$, an index of refraction $n_1$, a front convex first face of radius of curvature $r_1$, and a rear concave second face of radius of curvature $r_2$;

A second positive meniscus lens 2 spaced from the lens 1 a distance $l_1$, and having a thickness $t_2$, an index of refraction $n_2$, a front convex third face of radius of curvature $r_3$, and a rear concave fourth face of radius of curvature $r_4$;

A third negative meniscus lens 3 spaced from the lens 2 a distance $l_2$, and having a thickness $t_3$, an index of refraction $n_3$, a front convex fifth face of radius of curvature $r_5$, and a rear concave sixth face of radius of curvature $r_6$;

A fourth negative meniscus lens 4 spaced from the lens 3 a distance $l_3$ and having a thickness $t_3$, an index of refraction $n_4$, a front concave seventh face of radius of curvature $r_7$, and a rear convex eighth face of radius of curvature $r_8$; and A fifth positive lens 5 spaced from the lens 4 a distance $l_4$ and having a thickness $t_5$, an index of refraction $n_5$, a front face of radius of curvature $r_9$ and a rear convex face of radius of curvature $r_{10}$ and of greater curvature than the front face of the lens 5.

The distances between lenses are axially measured between the confronting faces of adjacent lenses and the lens thicknesses are also axially measured.

The dimensions, relationships and properties of the lenses 1 to 5 are such that the lens system satisfies the following conditions:

(1) $\nu_1, \nu_2 \geq 56$ (2) $25 < \nu_3 < 29$ (3) $F/2.2 < F_{1.2} < F1.8$ (4) $0.08F < l_2 < 0.12F$ (5) $0.2F \leq r_6 \leq 0.3F$ (6) $0.18F \leq |r_7| \leq 0.32F$ (7) $2F \leq r_9$ (8) $1.68 < n_3$ (9) $1.52 < n_4 < 1.6$

(10) $1.7 < n_5 < 1.8$ where $\nu_i$ is the Abbe's number of the $i$-th lens; $n_i$ is the $d$-line refractive index of the $i$-th lens; F is the resultant focal length of the whole lens system; $F_{1.2}$ is the resultant focal length of up to the second lens; $r_j$ is the radius of curvature of the $j$-th surface, and $l_k$ is the axial distance between the $k$-th lens and the next successive lens.

The conditions (1) and (2) in association with the conditions (3) and (4) serve, within the intended covering angle, to diminish axial chromatic aberration and chromatic difference of magnification. Even if the axial chromatic aberration, which is highly undercorrected by the first and the second lenses, is properly corrected by the third lens or can be corrected by the following portion of the lens system, it is difficult to make the chromatic difference of magnification ultimately very small, and it is feared that adverse influence should be exerted on correction of other aberrations. Thus, it is satisfactory to correct other aberrations on the basis of the conditions (1), (2) and (3), (4).

The conditions (3) and (4) are for the purpose of making the Petzval sum very small to achieve a high quality lens system. The condition (5), in association with the conditions (1) to (4), serves to prevent aggravation of coma aberration which is liable to be produced in attaining the object and is a limitation for obtaining improved gain of optical transfer function within the high frequency range. A very large reduction in $r_6$ with the sole intention of diminishing the Petzval sum would naturally result in the aggravation of coma aberration, which may be prevented by the condition (8) as well as by the condition (5). The conditions (6), (9) and (10) are also intended for diminishing the Petzval sum. The condition (6) is related to the condition (7) and serves to properly eliminate positive spherical aberration. The surface of $r_9$ as appears in the condition (7) has an important influence on the correction of astigmatism, and under the condition (7) the negative astigmatism, produced due to several conditions for Petzval sum reduction, is balanced. As one reason for suitable functioning of this surface, it owes much to aforementioned other conditions that under the condition (10) aberration balance is possible without producing high positive spherical aberration.

According to the present invention which satisfies aforementioned conditions, if, for example, F=500 mm., the spherical aberration is within Rayleigh's limit, and other aberrations can be corrected so as to be in an excellent condition balanced with said spherical aberration.

The following Table 1 sets forth the lens faces radii of curvature, the lens spacings and thicknesses, the indices of refraction and Abbe numbers of a specific example of a lens system of the present invention having an F=1000 and Table 2 sets forth the Seidel coefficients and their respective sums:

TABLE 1

| | | |
|---|---|---|
| $r_1$=634.300 | $t_1$=54.68 | $n_1$=1.64000/60.2 |
| $r_2$=2700.820 | $l_1$=1.99 | |
| $r_3$=345.582 | $t_2$=50.00 | $n_2$=1.64000/60.2 |
| $r_4$=1215.569 | $l_2$=103.89 | |
| $r_5$=1931.321 | $t_3$=55.01 | $n_3$=1.76182/26.5 |
| $r_6$=221.643 | $l_3$=175.00 | |
| $r_7$=−215.442 | $t_4$=43.74 | $n_4$=1.54814/45.9 |
| $r_8$=−338.465 | $l_4$=5.01 | |
| $r_9$=18591.425 | $t_5$=55.01 | $n_5$=1.75700/47.7 |
| $r_{10}$=−391.378 | | |

TABLE 2.—SEIDEL COEFFICIENTS

| | S1 | S2 | S3 | P | S5 |
|---|---|---|---|---|---|
| 1 | 0.93 | 0.59 | 0.38 | 0.62 | 0.63 |
| 2 | 0.07 | −0.17 | 0.41 | −0.14 | −0.63 |
| 3 | 0.68 | 0.38 | 0.21 | 1.13 | 0.74 |
| 4 | 1.91 | −1.43 | 1.08 | −0.32 | −0.57 |
| 5 | −2.75 | 1.67 | −1.01 | 0.22 | 0.48 |
| 6 | −1.47 | −1.52 | −1.58 | −1.95 | −3.66 |
| 7 | −3.25 | −0.70 | −0.15 | −1.64 | −0.38 |
| 8 | 0.42 | 0.07 | 0.01 | 1.05 | −0.18 |
| 9 | 0.00 | 0.02 | 0.20 | 0.02 | 2.65 |
| 10 | 3.59 | 1.32 | 0.48 | 1.10 | 0.58 |
| SUM | 0.13 | 0.09 | 0.03 | 0.09 | −0.34 |

In FIGURES 3 and 4 of the drawing there is illustrated another embodiment of the present invention and the corresponding aberration curves. The improved lens system includes five successive lenses 1 to 5 having configurations and relations corresponding to those of the first described embodiment and satisfying the above conditions (1) to (10).

The following Table 3 sets forth the lens faces radii of curvature, the lens spacing and thicknesses, the indices of refraction and Abbe numbers of another specific example of the lens system of the present invention having an F=1000, and Table 4 sets forth the Seidel coefficients and their respective sums:

TABLE 3

| | | |
|---|---|---|
| $r_1$=513.998 | $t_1$=55.01 | $n_1$=1.64000/60.2 |
| $r_2$=1365.181 | $l_2$=1.97 | |
| $r_3$=356.518 | $l_3$=48.99 | $n_2$=1.64000/60.2 |
| $r_4$=1338.771 | $l_4$=100.61 | |
| $r_5$=2996.500 | $l_5$=51.99 | $n_3$=1.74077/27.7 |
| $r_6$=224.189 | $l_6$=174.98 | |
| $r_7$=−235.127 | $l_7$=43.74 | $n_4$=1.53172/48.9 |
| $r_8$=−371.879 | $l_8$=5.01 | |
| $r_9$=2187.227 | $l_9$=43.74 | $n_5$=1.74320/49.3 |
| $r_{10}$=−453.395 | | |

TABLE 4.—SEIDEL COEFFICIENTS

|   | S1 | S2 | S3 | P | S5 |
|---|---|---|---|---|---|
| 1 | 1.75 | 0.90 | 0.46 | 0.76 | 0.63 |
| 2 | 0.00 | −0.03 | 0.35 | −0.29 | −0.66 |
| 3 | 0.47 | 0.28 | 0.16 | 1.09 | 0.74 |
| 4 | 2.10 | −1.51 | 1.08 | −0.29 | −0.57 |
| 5 | −3.15 | 1.75 | −0.97 | 0.14 | 0.46 |
| 6 | −1.72 | −1.71 | −1.71 | −1.90 | −3.60 |
| 7 | −2.67 | −0.41 | −0.06 | −1.48 | −0.24 |
| 8 | 0.31 | −0.09 | 0.02 | 0.93 | −0.27 |
| 9 | 0.02 | 0.09 | 0.45 | 0.19 | 3.17 |
| 10 | 3.04 | 0.81 | 0.22 | 0.94 | 0.31 |
| SUM | 0.15 | 0.08 | 0.00 | 0.09 | −0.03 |

An inspection of the aberration curves in FIGURES 2 and 4 illustrates the high degree of correction of the various aberrations in the specific examples of the present long focal length lens system, such lens systems being relatively simple.

We claim:

1. A lens system comprising five lenses and possessing the following dimensions and relationships:

| | | |
|---|---|---|
| $r_1 = .634300F$ | $t_1 = .05468F$ | $n_1 = 1.64000/60.2$ |
| $r_2 = 2.700820F$ | $l_1 = .00199F$ | |
| $r_3 = .345582F$ | $t_2 = .05000F$ | $n_2 = 1.64000/60.2$ |
| $r_4 = 1.215569F$ | $l_2 = .10389F$ | |
| $r_5 = 1.931321F$ | $t_3 = .05501F$ | $n_3 = 1.76182/26.5$ |
| $r_6 = .221643F$ | $l_3 = .17500F$ | |
| $r_7 = -.215442F$ | $t_4 = .04374F$ | $n_4 = 1.54814/45.9$ |
| $r_8 = -.338465F$ | $l_4 = .00501F$ | |
| $r_9 = 18.591425F$ | $t_5 = .05501F$ | $n_5 = 1.75700/47.7$ |
| $r_{10} = -.391378F$ | | | wherein the lenses are successively designated as 1 to 5, the lens faces are successively designated as 1 to 10, F is the focal length of the lens system, $r_i$ is the radius of curvature of the $i$-th lens face; $t_j$ is the thickness of the $j$-th lens; $l_k$ is the spacing between the $k$-th lens and the next successive lens; and $n_n$ is the index of refraction and Abbe value of the $n$-th lens.

2. A lens system comprising five lenses and possessing the following dimensions and relationships:

| | | |
|---|---|---|
| $r_1 = .513998F$ | $t_1 = .05501F$ | $n_1 = 1.64000/60.2$ |
| $r_2 = 1.365181F$ | $l_1 = .00197F$ | |
| $r_3 = .356518F$ | $t_2 = .04899F$ | $n_2 = 1.64000/60.2$ |
| $r_4 = 1.338771F$ | $l_2 = .10061F$ | |
| $r_5 = 2.996500F$ | $t_3 = .05199F$ | $n_3 = 1.74077/27.7$ |
| $r_6 = .224189F$ | $l_3 = .17498F$ | |
| $r_7 = -.235127F$ | $t_4 = .04374F$ | $n_4 = 1.53172/48.9$ |
| $r_8 = -.371879F$ | $l_4 = .00501F$ | |
| $r_9 = 2.187227F$ | $t_5 = .04374F$ | $n_5 = 1.74320/49.3$ |
| $r_{10} = -.453395F$ | | | wherein the lenses are successively designated as 1 to 5, the lens faces are successively designated as 1 to 10, F is the focal length of the lens system, $r_i$ is the radius of curvature of the $i$-th lens face; $t_j$ is the thickness of the $j$-th lens; $l_k$ is the spacing between the $k$-th lens and the next successive lens; and $n_n$ is the index of refraction and Abbe value of the $n$-th lens.

References Cited

UNITED STATES PATENTS 2,683,396 7/1954 Klemt et al. _____ 350—218
2,826,116 3/1958 Mukai _____ 350—218 X
3,152,213 10/1964 Hermanni _____ 350—218 X DAVID SCHONBERG, Primary Examiner P. A. SACHER, Assistant Examiner